United States Patent [19]

D'Ignazio et al.

[11] Patent Number: 5,208,808
[45] Date of Patent: May 4, 1993

[54] METHOD OF ASSIGNING SLOTS IN A UCOL-TYPE STAR NETWORK AND ELECTRONIC DEVICE FOR CARRYING OUT SUCH METHOD

[75] Inventors: Franco D'Ignazio, Pomezia; Bruno Bianchi, Velletri, both of Italy

[73] Assignee: Alcatel, N.V., Amsterdam, Netherlands

[21] Appl. No.: 764,548

[22] Filed: Sep. 24, 1991

[30] Foreign Application Priority Data

Sep. 28, 1990 [IT] Italy .................. 21605 A/90

[51] Int. Cl.⁵ .............................................. H04J 3/16
[52] U.S. Cl. ................................ 370/85.7; 370/94.3; 370/95.1
[58] Field of Search ............ 370/85.7, 94.3, 95.1

[56] References Cited
U.S. PATENT DOCUMENTS 4,763,320  8/1988  Rudolph et al. ............. 370/85.7
5,079,763  1/1992  Chao et al. ................. 370/85.7 X

FOREIGN PATENT DOCUMENTS 0225442  3/1988  European Pat. Off. .

OTHER PUBLICATIONS

Proceedings of the Fourth Tirrenia International Workshop on Digital Communications, Sep. 1989, Amsterdam NL, pp. 249-263; A. Fioretti et al.: "Research of Coherent Optical Lans".

Primary Examiner—Douglas W. Olms
Assistant Examiner—Russell Blum
Attorney, Agent, or Firm—Ware, Fressola, Van Der Sluys & Adolphson

[57] ABSTRACT

A timeslot assigning circuit for use in a UCOL-type star network includes a first circuit block having a RAM-type memory for storing incoming requests for assignment. The first circuit block is connected to a second circuit block, which includes a FIFO memory in which requests for assignment are cyclically loaded. A decrementing circuit is connected downstream from the FIFO memory, and a filter is connected at the input of the FIFO memory and downstream on the decrementing circuit, so that requests for assignment which are null or are already satisfied are eliminated. A control circuit permits the cyclic scanning of requests, while a second FIFO memory is provided at the output of the first FIFO memory to contain the requests relative to single slots assigned during an operating cycle.

5 Claims, 1 Drawing Sheet

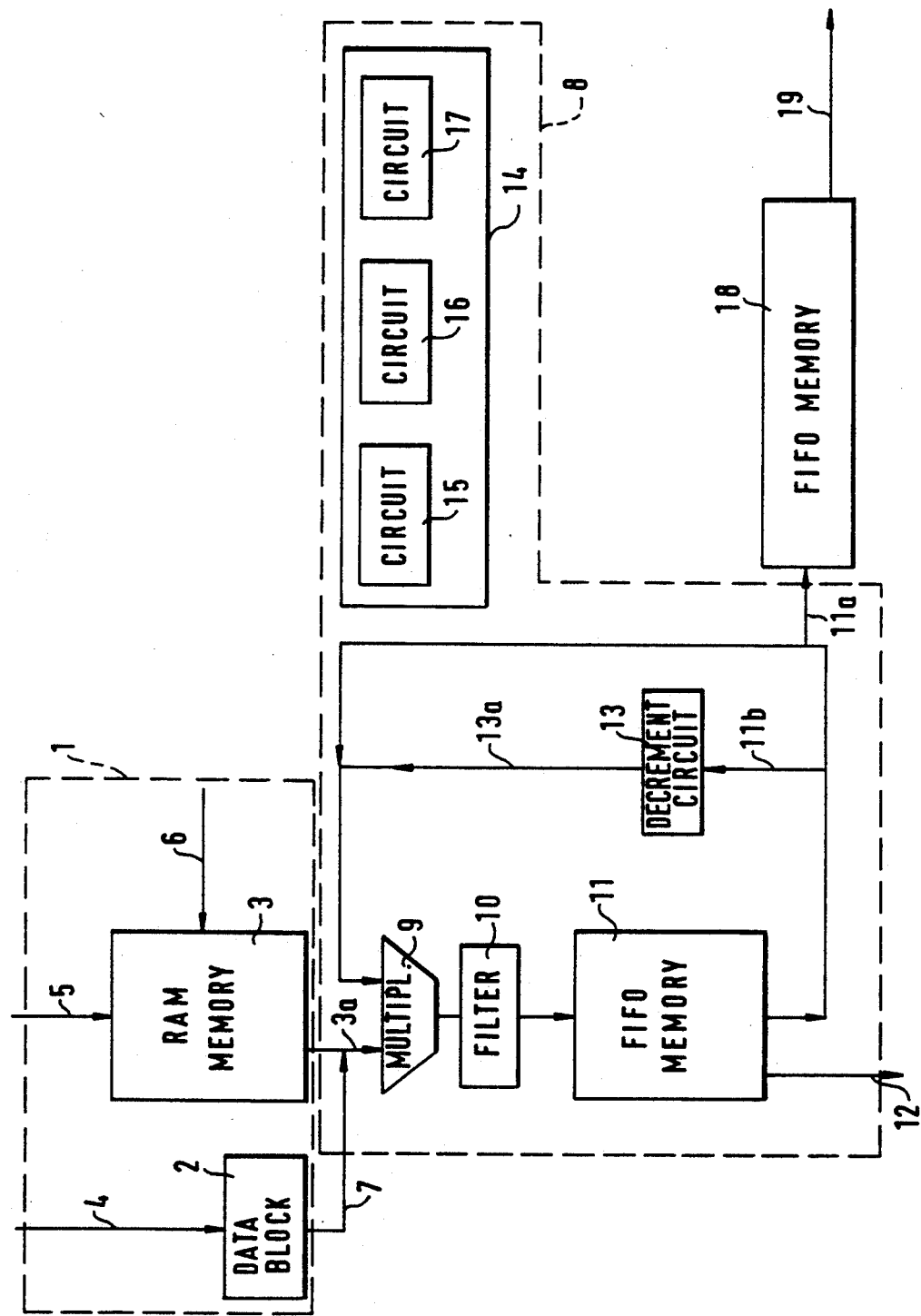

METHOD OF ASSIGNING SLOTS IN A UCOL-TYPE STAR NETWORK AND ELECTRONIC DEVICE FOR CARRYING OUT SUCH METHOD

BACKGROUND OF THE INVENTION

1. Field of the Invention

The present invention relates to a method of assigning slots in an Ultra-Wide Coherent Optical Local star network and to an electronic device for carrying out the method.

2. Description of the Prior Art

As known, a UCOL network is a passive optical star network i.e. having stations connected to a star center via two-way dedicated optical waveguides.

One waveguide is used for transmission from the station to the star center and the other for receiving.

Each optical waveguide transmits optical signal over multiple channels. The particular optical waveguide allows several channels to be frequency division multiplexed and used for several transmissions on the same waveguide thus optimizing the link resources.

In a UCOL network, for each single channel, a transmission scheme based upon the use of a frame with a length of one millisecond, is adopted, its structure being described in an Italian patent application No. 21112 A/89 (filed Jul. 6, 1989) of the same applicant having a corresponding U.S. patent application No. 07/549,371.

In control data present in the frame, there is data which regulates the access of stations to the physical medium, i.e. those enabling each station to determine which of the data slots in the frame are reserved to the station itself for transmitting its own traffic.

It is important to point out that this type of information transmitted in a frame N is used for arbitrating the access of a following frame N+1 to the informative field.

Each station receives control information with a delay in comparison with time reference of the optical network star center. Having received control information, the station processes it to determine slots of a next frame which it will be allowed to use.

Successively, at the beginning of the following frame, the station may start to transmit in the slots reserved to it, but once again, in comparison with the star center time reference, it has to advance its transmission by an amount of time equal to the optical network star center time delay which corresponds to the propagation time of the signal along the outward waveguide.

If the duration of a frame is one millisecond, since it has been established that the maximum fibre length is 80 Km with a corresponding propagation delay of 400 microseconds, one can infer that the time interval available for processing requests for slots is only 200 microseconds. Hence it is evident that such time interval is very small.

SUMMARY OF THE INVENTION

In this situation, the object of the invention is to provide a method of assigning slots in a UCOL-type star network and an electronic device for carrying out such method in order to overcome the above-mentioned technical limit known in the prior art.

It is an object of the present invention to provide a method of assigning slots in a UCOL-type star network and an electronic device for carrying out such method that it fast enough for real time operation.

Another object of the present invention is to provide an electronic device of the type mentioned above having a simple hardware architecture.

The task and the aforesaid objects are substantially achieved by a method of assigning slots available in a frame for a UCOL-type star network, affected simultaneously by all stations belonging to the network itself, in which each station may request one or more slots with a single request in relation to the value of the request itself. The method includes the steps of writing requests for assigning slots from all the stations in a first memory unit, thereafter transferring requests which are not null into a second memory unit while eliminating requests which are null, cyclically decrementing requests which are in said second memory unit, transferring requests from the second memory unit relative to assignments of single slots into a third memory unit, eliminating from the second memory unit requests which are fully satisfied, and repeating the last three steps until all requests for slots are satisfied or all slots available in a frame have been used.

An electronic device for carrying out the above method includes a first circuit block having a first memory unit, such as a RAM, for storing incoming requests for assignment. The first circuit block is connected to a second circuit block, including a second memory of the FIFO type, in which requests for assignment to be carried out are cyclically loaded. A decrementing circuit is connected downstream from the second memory unit, and a filter means is connected to the input of said second memory unit and downstream from said decrementing circuit, and is designed to eliminate the requests for assignment which are null or already satisfied. A control circuit is provided to permit and realize the cyclic scanning of requests, while a third memory unit is provided at the output of said second circuit block, designed to contain the requests relative to single slots assigned during each cycle.

DESCRIPTION OF THE DRAWINGS

The invention will now be described in detail next herein, with reference to the accompanying drawing having a sole FIG. 1 merely by way of an indicative and not limitative example in which the hardware architecture which meets the requirements of the present invention is illustrated in a schematic block diagram.

DESCRIPTION OF THE INVENTION

Referring to FIG. 1, a pre-processing storage circuit block 1 provides for the storage of requests for slots from the various stations before they are processed.

Pre-processing storage circuit 1 has a RAM memories 3 where all incoming signals 5 are stored and an identification code circuit 2 where data belonging to a reference station is marked.

The identification code circuit 2 is provided, through a signal 4, with the identification code of the reference station.

A control logic signal 6 enables the storage into RAM memory 3 for controlling data to be loaded with respect to data which are not to be stored.

Pre-processing storage circuit block 1 is connected to processing circuit block 8 comprising a multiplexer 9 which receives stored data via line 3a from RAM memory 3 as well as an identification signal via line 7 from section the identification code circuit 2 consisting of a mark bit of the station. Such signals are then filtered by a filter 10 and stored in a memory 11 of the type FIFO (first-in-first-out), which in turn generates memory status identification signals 12 which are used only for indicating memory empty or devoid of requests to be satisfied.

Instead, a processing request read out by of FIFO memory 11, which is deprived of a mark bit, is sent to a decrement circuit 13, through a signal via line 11b; which the decrement circuit 13 in turn generates a loop signal via line 13a used to loop the request back to the multiplexer 9.

The mark bit of the processing request, via line 11a, also proceeds to a positioning memory 18, which is used for registering the processing request. The mark bit is also added to the request passed through the decrement circuit 13. A control unit 14 is used to define priority criteria by means of a priority criteria circuit 15, loading, i.e. storing criteria by means of storage criteria circuit 16 and of memory scanning criteria through a memory scanning criteria circuit 17. Signal 11a enable the effective request for slots by the abovementioned station with respect to the scheduling unit 18 which finally generates a signal via line 19 which allows the definitive assignment of slots to the abovementioned station.

Having outlined the hardware embodying the present invention, its operation follows in detail.

First, it is important to note that requirements of the algorithm for processing slot requests from stations, have to involve an implementation that shall not be too onerous i.e. a very simple circuitry, and a velocity such as to allow a real time handling.

Moreover, it is necessary that logic implementing this algorithm is easily embodied in a VLSI circuit and that the velocity of this logic, i.e. its clock, is compatible with the characteristics of a Gate Array CMOS structure which from an industrial manufacturing point of view, is a less expensive circuit embodiment.

The algorithm works as follows.

Having all stations received the requests, such requests are processed.

Starting from the lowest request, slots are reserved, one for each station, until a number of slots equal to the number of requested cells is assigned to each station or until all the data slots of the frame are engaged.

Only after having assigned all slots having a similar priority, the assignment of next priority slots will be started.

Each station is not requested to know what station is engaging each slot but it merely must know what are the slots it has to engage; this to simplify very much the processing algorithm.

The results of such request processing are stored in a buffer also of type FIFO and represented by scheduling unit 18, in which every bit is associated with a determined data slot of the transmission frame. If such bit has value 1, that means the corresponding data slot shall belong to the station, otherwise it will belong to any other of the remaining stations.

Processing circuit block 18 is handled by a plurality of circuits represented by sections 9, 10, 11, 15, 16, 17 and hence those related to block 8 as a whole.

In processing circuit block 8 most of the functions associated with the processing algorithm are implemented. The requests for slots are not processed at the same moment in which they are received by the single station, because of speed parameter, but they are preliminarily stored in storage block 1 which allows the storage of requests and the successive re-reading out by processing block 8 according to an order which is different from the arrival order of the requests.

Inside pre-storage circuit block 1 is a storage device of type RAM (Random Access Memory) represented by section 3, a data loading-unloading control logic signal, via line 6 in the FIG. 1. An identification code circuit 2 marks the unloading of data relative to all stations, those which belong to the station in question.

At the beginning, the procedure for starting the processing logic is commenced; then there is started a loading cycle in which all requests are read out from the corresponding page of RAM memory 3 in such a way as they are re-written in the FIFO memory 11 after having passed through multiplexer 9 and filter 10.

As mentioned, the requests before being written, pass through filter 10 whose function is to verify that their content is not null and only in this instance it enables the writing in the FIFO memory 11.

It is evident that the action of filter 10 is used to prevent waste of precious time in processing. After loading FIFO memory 11, each is marked by a dedicated bit called ADDRESS MARK which is used only to identify the requests of the station in question.

In a scanning phase, the requests loaded in the FIFO memory 11 are extracted one at a time to be processed through output signals vialines 11b and 11a.

The request, vialine 11b, is read out and decremented by decrement circuit block 13 and transferred, vialine 13a, via multiplexer 9, again to filter 10; the filter 10 checks the value of the request and if this results to be different from zero, the filter writes it again in the FIFO memory 11. The decrement action exerted on request does not concern anyway the mark bit 11a, which remains unchanged.

The filter 10 prevents the waste of precious processing time in handling requests which are already fully satisfied.

When a request is read out, the corresponding mark bit 11a fills a memory location in the memory cell of the FIFO-type block 18. The reason of this operation lies in that, being the request certainly not null, a slot must be assigned anyway and therefore a further bit has to be engaged. If the request belongs to the station itself, i.e. if the identification bit vialine 11a has value 1, the further bit is set to 1 and the corresponding slot is assigned to the station, otherwise the further bit is set to 0 and therefore the station in question shall consider the slot as not belonging to it.

This step ends when all requests, after having been repeatedly decremented, reach the null value. Then this situation is recognized the read out request results null after the decrement and that the FIFO memory 11 remains empty, which is indicated by the null, i.e. unloaded, empty memory signal 12.

In the scanning of various requests performed by memory scanning criteria block circuit 17, the counting of all slots which are gradually assigned is carried out. Where the number of such slot has reached the value of four hundred twenty six (426), the processing of requests is stopped.

The number 426 is the number of slots contained in a transmission frame of a UCOL network.

Once all the control information and all the sixty four stations of a UCOL network are available in the pre-processing storage block 1, about 200 microseconds are available for elaborating the requests and storing the pertinent results into transmission memory which then assigns slots to the various stations.

Since the processing times vary according to the requests, it is necessary to calculate these times in a rather tolerant fashion.

In order to calculate such tolerant time it should be noted that the total processing time depends on the total data loading time from block 1 into the FIFO memory 11 and on total scanning execution time among the various stations.

More precisely, the total loading time from pre-processing storage circuit block 1 to FIFO memory 11 is nine times the time spent on a single loading cycle and such single loading cycle depends essentially on the access time from RAM memory of section 3 in storage block 1 to FIFO memory 11.

Moreover the total scanning execution times of the various stations is simply four hundred twenty six times the time necessary for the read out of a word from FIFO memory and its decrement and for its eventual writing.

Considering these two parameters, the total sum is less than one hundred forty by three microseconds and therefore the processing algorithm meets the requirements defined at the outset to satisfy the processing velocity in a UCOL network.

The circuitry as described above can be critical only for processing times. In fact the overall circuit must operate in real time, i.e. it must process the requests for slots from the stations and be ready to provide the map of slots engaged by the stations in the next frame. Considering that this time interval between transmission and reception is calculated for a well pre-established value, during such time interval the circuit must process a plurality of priority values starting from the first one to the last one and assigning to each station the relative slots.

By means of block 17 and decrement circuit block 13 the recycle of data on the same memory FIFO 11, with a decrement at each passage and writing if the data is different from zero, is realized. This operation is very important since it optimizes the processing time.

Thus the invention fully achieves the above-mentioned objects.

In fact, the entire operation, as said before, is performed in a time which is much less than the 200 microseconds mentioned at the outset and therefore it allows to wed a simple circuit embodiment with a linear and not onerous implementation of the algorithm.

Obviously further structural and functional embodiments are also possible without departing from the spirit of the present invention.

We claim:

1. A method of assigning slots available in a frame for a UCOL-type star network, effected simultaneously by all stations belonging to the network itself, in which each station may request one or more slots with a single request in relation to the value of the request itself, characterized by comprising the following steps:
   a) writing request for assigning slots from all the stations, in a first memory unit;
   b) transferring requests which are not null into a second memory unit while eliminating requests which are null;
   c) cyclically decrementing requests which are in said second memory unit;
   d) transferring requests relative to assignments of single slots obtained in step c) into a third memory unit;
   e) eliminating, from said second memory unit, requests which are fully satisfied;
   f) repeating steps c), d) and e) until all requests for slots are satisfied or all slots available in a frame are run out.

2. A method according to claim 1, characterized in that step b) is preceded by a step in which, to each individual request, an informative field, designed to indicate the station to which the request belongs, is added, and that only informative fields relative to assignments obtained in step c) are transferred into said third memory unit.

3. Electronic device, comprising:
   a first circuit block (1) including a first memory unit (3) of the type RAM for storing incoming requests for assignment,
   a second circuit block (8) being connected to said first circuit block (1), the second circuit block (8) having a second memory unit (11) in which requests for assignment to be carried out on a first-in-first-out (FIFO) basis are cyclically loaded, having decrement circuit means (13) connected downstream from said second memory unit (11), having filter means (10) coupled between an input of said second memory unit (11) and said decrement circuit means (13) for eliminating the requests for assignment which are null or already satisfied, and having control circuit means (14) which permits and realizes the cyclic scanning of requests, and
   a third memory unit (18) provided at an output of said second circuit block (8) for storing the requests relative to single slots assigned during each cycle.

4. Electronic device according to claim 3, wherein the first block (1) includes identification circuitry (2) for generating a signal (7) identifying the station to which each request belongs that is present in the first memory unit (3).

5. Electronic device according to claim 3, wherein the circuitry implementing the processing algorithm for assigning slots is integrable in a VLSI-CMOS circuitry.

* * * * *